(12) United States Patent
Liu et al.

(10) Patent No.: US 10,264,013 B2
(45) Date of Patent: Apr. 16, 2019

(54) PREVENTING A MEMORY ATTACK TO A WIRELESS ACCESS POINT

(71) Applicant: HEWLETT PACKARD ENTERPRISE DEVELOPMENT LP, Houston, TX (US)

(72) Inventors: Yongqiang Liu, Beijing (CN); Shijian Li, Beijing (CN); Jun Qing Xie, Beijing (CN); Xunteng Xu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 547 days.

(21) Appl. No.: 14/762,181

(22) PCT Filed: Jan. 18, 2013

(86) PCT No.: PCT/CN2013/070640
§ 371 (c)(1),
(2) Date: Jul. 20, 2015

(87) PCT Pub. No.: WO2014/110775
PCT Pub. Date: Jul. 24, 2014

(65) Prior Publication Data
US 2015/0358346 A1     Dec. 10, 2015

(51) Int. Cl.
*H04L 29/06* (2006.01)
*H04W 12/08* (2009.01)
(Continued)

(52) U.S. Cl.
CPC .... *H04L 63/1441* (2013.01); *G06F 17/30864* (2013.01); *H04L 63/1458* (2013.01);
(Continued)

(58) Field of Classification Search
None
See application file for complete search history.

(56) References Cited

U.S. PATENT DOCUMENTS 6,032,207 A * 2/2000 Wilson .................... G06F 7/24
                                                        707/999.003
7,912,023 B2   3/2011 Stephenson et al.
(Continued)

FOREIGN PATENT DOCUMENTS

| CN | 101222388 | 7/2008 |
| CN | 101480089 | 7/2009 |

(Continued)

OTHER PUBLICATIONS

Stephenson et al., "Limiting GAS State-1 Query Response Length", Jan. 15, 2007.*

(Continued)

*Primary Examiner* — Henry Tsang
(74) *Attorney, Agent, or Firm* — Brooks, Cameron & Huebsch, PLLC (57) ABSTRACT

Systems, methods, and machine-readable and executable instructions are provided for preventing a memory attack to a wireless access point (AP). Preventing a memory attack to a wireless access point can include receiving, with a wireless AP, a generic advertisement service (GAS) initial request from a querying station and transmitting, with the wireless AP, a GAS initial response to the querying station without querying an advertisement server based on the GAS initial request.

18 Claims, 7 Drawing Sheets

(51) Int. Cl.
*G06F 17/30* (2006.01)
*H04W 12/12* (2009.01)
*H04W 84/12* (2009.01)

(52) U.S. Cl.
CPC ............ *H04W 12/08* (2013.01); *H04W 12/12* (2013.01); *H04L 63/1483* (2013.01); *H04W 84/12* (2013.01)

(56) References Cited

U.S. PATENT DOCUMENTS

| | | | |
|---|---|---|---|
| 2007/0243888 | A1 | 10/2007 | Faccin |
| 2009/0274094 | A1 | 11/2009 | Engwer |
| 2009/0319577 | A1* | 12/2009 | Obasanjo ............... G06Q 10/10 |
| 2010/0131751 | A1 | 5/2010 | Reznik et al. |
| 2010/0146272 | A1* | 6/2010 | Centonza ............... H04W 28/02 |
| | | | 713/168 |
| 2011/0134897 | A1 | 6/2011 | Montemurro et al. |
| 2012/0165056 | A1 | 6/2012 | Kim et al. |
| 2012/0230308 | A1 | 9/2012 | Saito et al. |
| 2013/0109313 | A1 | 5/2013 | Kneckt |
| 2013/0176897 | A1 | 7/2013 | Wang |
| 2014/0185598 | A1* | 7/2014 | Canpolat ............... H04W 48/16 |
| | | | 370/338 |
| 2014/0189276 | A1* | 7/2014 | Chang .................. G06F 12/109 |
| | | | 711/165 |

FOREIGN PATENT DOCUMENTS

| | | |
|---|---|---|
| CN | 101778387 | 7/2010 |
| CN | 101779417 | 7/2010 |
| CN | 102065067 | 5/2011 |
| CN | 102739659 | 10/2012 |
| EP | 2498472 | 9/2012 |
| WO | WO-2008107306 A1 | 9/2008 |

OTHER PUBLICATIONS

Liu et al., "Security Analysis and Improvements of IEEE802.11u", Dec. 21, 2012, pp. 1-10.*

802 11 TGU: "802.11u Current Draft; sg-emergency-services-10-0021-00-ESSG-802-11u-current-draft", IEEE draft; SG-Emergency-Services-10-0021-00-ESSG-802-11U-Current-Draft, IEEE-SA Mentor, Piscatawy, NJ USA, vol. 802.23, Feb. 4, 2010 (Feb. 4, 2010), pp. 1-196, XP017655627.

Yongqiang Liu; Et al: "Security Analysis and Improvements of IEEE802.11u", Dec. 21, 2012 (Dec. 21, 2012), XP055143372.

International Search Report and Written Opinion dated Oct. 17, 2013, issued on PCT Patent Application No. PCT/CN2013/070639 dated Jan. 18, 2013, The State Intellectual Property Office, P.R. China.

Cisco, "Cisco Wireless LAN Controller Configuration Guide, Release 7.3", Aug. 28, 2012, pp. 1-942, San Jose, CA, USA. http://www.cisco.com/en/US/docs/wireless/controller/7.3/configuration/guide/b_cg73.pdf.

De Rango, et al., "Static and Dynamic 4-Way Handshake Solutions to Avoid Denial of Service Attack in Wi-Fi Protected Access and IEEE 802.11i," EURASIP Journal on Wireless Communications and Networking, vol. 2006, Article ID 47453, Oct. 10, 2005, pp. 1-19.

Faria, et al., "Detecting Identity-Based Attacks in Wireless Networks Using Signalprints," ACM Workshop on Wireless Security (WiSe 2006), Sep. 29, 2006, Lost Angeles, CA, USA, pp. 43-52.

Ferreri, et al., "Access points vulnerabilities to DoS attacks in 802.11 networks," IEEE Wireless Communications and Networking Conference 2004, Mar. 21-25, 2004, pp. 634-638.

He, et al., "Security Analysis and Improvements for IEEE 802.11i," The 12th Annual Network and Distributed System Security Symposium, Feb. 3-4, 2005, 19 pages.

IEEE Computer Society, "Part 11: Wireless LAN Medium Access Control (MAC) and Physical Layer (PHY) Specifications," Feb. 25, 2011, 208 pages, New York, NY, USA.

International Search Report and Written Opinion dated Oct. 17, 2013, issued on PCT Patent Application No. PCT/CN2013/070640 dated Jan. 18, 2013, The State Intellectual Property Office, P.R. China.

Lemon, Jonathan., "Resisting SYN flood DoS attacks with a SYN cache," Proceedings of the BSDCon 2002, Feb. 11-14, 2002, San Francisco, CA, USA, 9 pages.

Orlandi, et al., "WI-FI Roaming—Building on ANDSF and Hotspot2.0," Feb. 26, 2012, 45 pages.

Saqaeeyan, et al., "Prevention of 4-way Handshake Blocking in IEEE 802.11i by an Statistical Method and Changing Message3," 2011 IEEE 2nd International Conference on Software Engineering and Service Science, Jul. 15-17, 2011, pp. 200-203.

Unknown., "CERT Advisory CA-1996-21 TCP SYN Flooding and IP Spoofing Attacks," Sep. 19, 1996, 11 pages.

EPO Search Report cited in EP Appl. No. 13871895.2 dated Jul. 26, 2016; 10 pages.

Liu Yongqiang, et al: "Keyword(s): Abstract: Security Analysis and Improvements of IEEE802.11u", Dec. 21, 2012 (Dec. 21, 2012), XP055143372, 10 pages.

* cited by examiner

Fig. 6

PREVENTING A MEMORY ATTACK TO A WIRELESS ACCESS POINT

CLAIM FOR PRIORITY

The present application is a national stage filing under 35 U.S.C 371 of PCT application number PCT/CN2013/070640, having an international filing date of Jan. 18, 2013, the disclosure of which is hereby incorporated by reference in its entirety.

BACKGROUND

The Institute of Electrical and Electronics Engineers (IEEE) 802.11u is an extension of the IEEE 802.11 standard to improve the ability of mobile stations (e.g., laptop computers, smartphones, tablets, etc.) to automatically discover, authenticate, and use a wireless access point (AP), which delivers a cellular network-like mobile broadband experience that users want. An IEEE 802.11u enabled wireless AP may provide an unauthenticated mobile station with query capabilities of the wireless AP and its backhaul access networks before associating. Examples of environments that may use an IEEE 802.11u wireless AP can include educational campuses, airports, hotels, and/or retail outlets, among others.

DETAILED DESCRIPTION

The generic advertisement service (GAS) is a component of IEEE 802.11u that enables a mobile station to query an advertisement server for information element (IEs) via a wireless AP. GAS provides for layer 2 transport of an advertisement server's responses between the advertisement server, a wireless AP, and a mobile station. An example of a protocol for formatting GAS messages is the access network query protocol (ANQP). The wireless AP is responsible for relaying the mobile station's query to the advertisement server in the carrier's network and for delivering the advertisement server's response back to the mobile station. ANQP is a query and response protocol used by a mobile station to discover a range of IEs including the operator's domain name, roaming partners accessible via the wireless AP along with their credential type and extensible authentication protocol (EAP) method supported for authentication, Internet protocol (IP) address type availability, among other IEs.

A message exchange procedure for GAS/ANQP may include a station sending an ANQP query encapsulated in a GAS initial request message to a wireless AP. The wireless AP may allocate a memory block (control block) to store information from the query such as the station media access control (MAC) address, a dialog identifier, etc. The wireless AP may then send a query to an advertisement server, which may be located in the operator's core network. The advertisement server stores the ANQP IEs. After querying the advertisement server, the wireless AP may answer the station with a GAS initial response message. When the wireless AP receives the response from the advertisement server, it can buffer the IEs in the control block. The station may send a GAS comeback request message to fetch the buffered response from the wireless AP.

The message exchange procedure for GAS/ANQP may make the wireless AP vulnerable to a memory attack. The memory blocks allocated by the wireless AP for each incoming GAS initial request may be maintained until the procedure is completed or aborted. The amount of memory used by the memory blocks can be significant because the buffered ANQP IEs may be significantly large. To avoid memory exhaustion, the wireless AP may limit the number of concurrent GAS initial requests that it serves. However, in the case of a memory attack (e.g., a GAS initial request flood), the memory of the wireless AP can be consumed by the IEs and/or legitimate GAS initial requests may go ignored (e.g., denial of service) if the wireless AP hits a limit on the number of concurrent GAS initial requests.

Figure 1:
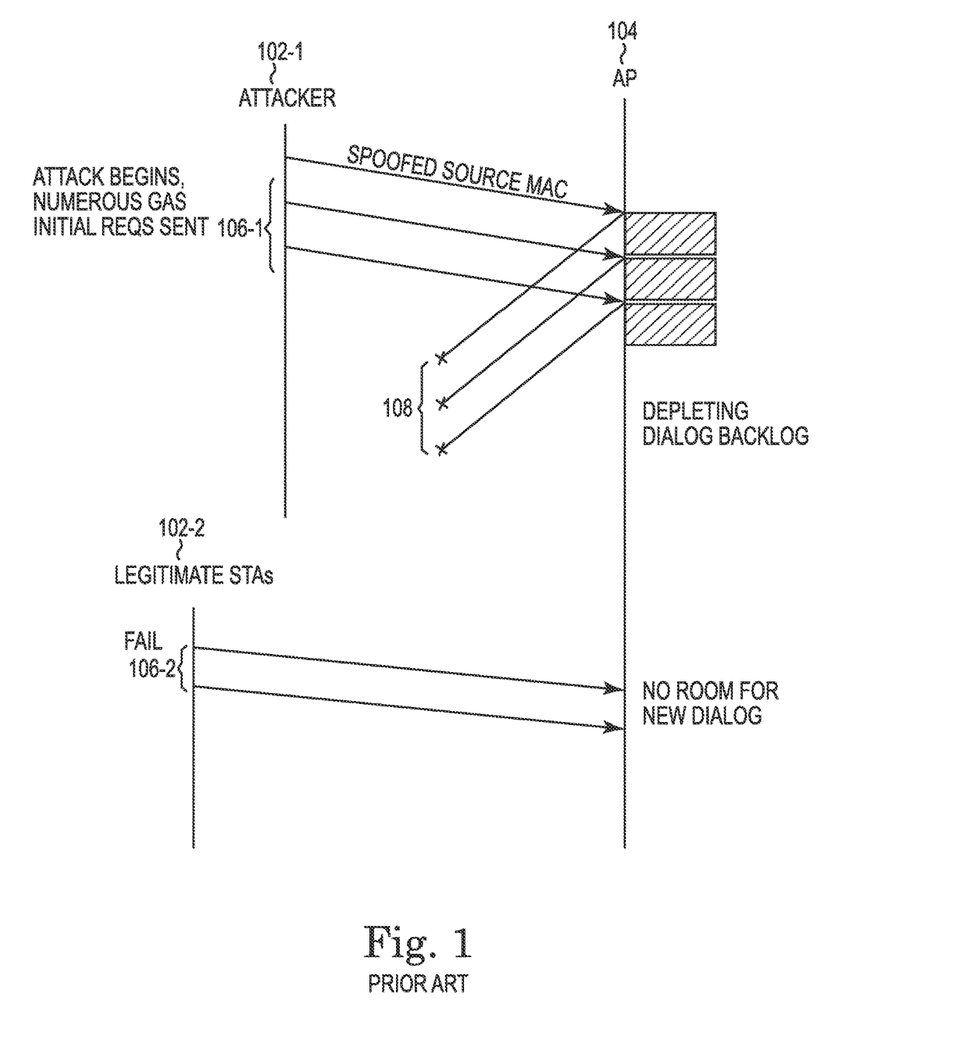
FIG. 1 is a prior art diagram illustrating an instance of a memory attack to a wireless access point.

FIG. 1 is a prior art diagram illustrating an instance of a memory attack to a wireless access point 104. An attacking mobile station 102-1 may send numerous GAS initial requests 106-1 with spoofing source MAC addresses to query multiple ANQP IEs such as venue name, network access identifier (NAI) realm list, etc. The query responses from the advertisement server (not illustrated in FIG. 1) are buffered by the wireless AP 104, which may quickly deplete the dialog backlog of the wireless AP 104. The spoofing MAC addresses make it more difficult for the wireless AP 104 to detect the attack and force the wireless AP 104 to spend more memory resources storing ANQP responses. The GAS initial responses 108 to each of the GAS initial requests 106-1 are sent by the wireless AP 104, but may not be received by the attacking mobile station 102-1 because of the spoofing MAC addresses. Meanwhile, either because of depleted memory resources of the wireless AP 104 or because of a limit on a number of concurrent GAS initial requests being served by the wireless AP, GAS initial requests 106-2 from legitimate stations 102-2 may be dropped, ignored, and/or not received by the wireless AP 104, causing a denial of service.

In contrast, according to the present disclosure, systems, methods, and machine-readable and executable instructions are provided for preventing a memory attack to a wireless access point (AP). Preventing a memory attack to a wireless access point can include receiving, with a wireless AP, a generic advertisement service (GAS) initial request from a querying station and transmitting, with the wireless AP, a GAS initial response to the querying station without querying an advertisement server based on the GAS initial request.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. For example, reference numeral 204 in FIG. 2 can identify element "04", while an analogous element may be identified as 604 in FIG. 6. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 2:
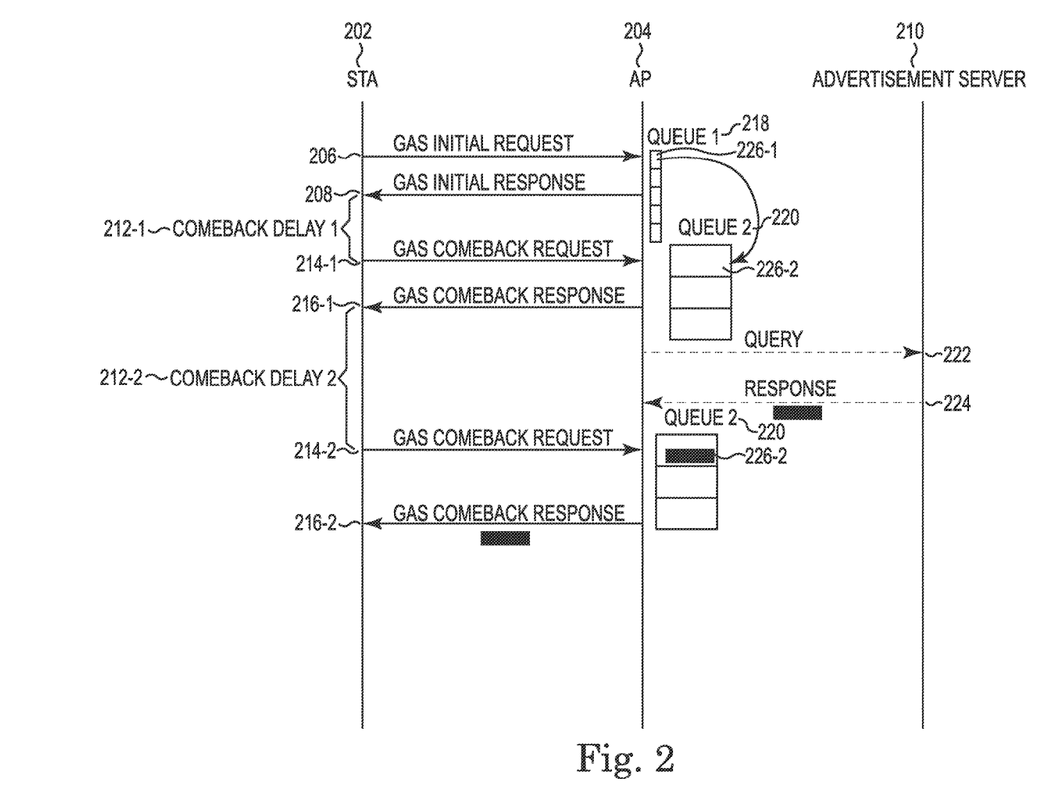
FIG. 2 is a diagram illustrating an example of preventing a memory attack to a wireless access point according to the present disclosure.

FIG. 2 is a diagram illustrating an example of preventing a memory attack to a wireless access point 204 according to the present disclosure. A mobile station 202 can transmit a GAS initial request 206 to the wireless AP 204. An ANQP query can be encapsulated in the GAS initial request 206 message. The wireless AP 204 can (e.g., via a non-transitory machine readable medium storing instructions executable by a processing resource of the wireless AP 204) allocate an initial control block 226-1 in a first stage memory queue 218 for the GAS initial request (e.g., to store parameters of the GAS initial request such as a MAC address of the querying station 202, a dialog identifier, a query type, etc.). The wireless AP 204 can transmit a GAS initial response 208 to the querying mobile station 202 without querying an advertisement server 210 based on the GAS initial request 206. Because the wireless AP 204 is not querying the advertisement server 210 (at this point), the first stage memory queue (and the initial control block 226-1) can be small relative to the amount of memory that would normally be reserved to store IEs from the advertisement server 210. Therefore, more entries can be stored in the first stage memory queue 218 (e.g., the number of concurrent GAS initial requests being served by the wireless AP can be increased relative to some previous approaches because the wireless AP will not have as much memory reserved and/or used in association with each GAS initial request).

The GAS initial response 208 can include an indication of a first comeback delay 212-1, which effectively tells the querying mobile station 202 "I will get your information from the advertisement server, please come back later to fetch it." The first comeback delay 212-1 that is associated with the GAS initial request 206 can be set by the wireless AP 204 and stored in the initial control block 226-1. In some examples, the first comeback delay 212-1 can be randomly generated within a range of comeback delays. Randomly generating the first comeback delay 212-1 can help prevent an attacking station (e.g., station 102-1 illustrated in FIG. 1) from guessing the comeback delay and responding accordingly to further the attack.

If the querying station is legitimate, it is more likely to obey the first comeback delay 212-1 and send its first GAS comeback request 214-1 at the appropriate time after the first comeback delay 212-1. In response to receiving the first GAS comeback request 214-1 from the querying mobile station 202 (e.g., if the first GAS comeback request 214-1 complies with the first comeback delay 212-1), the wireless AP 204 can move the initial control block 226-1 from the first stage memory queue 218 to a larger control block 226-2 in a second stage memory queue 220. Although not specifically illustrated, the wireless AP 204 can drop a comeback request from the querying mobile station 202 in response to the comeback request not complying with an associated comeback delay in order to help prevent attacks from rogue stations. The first stage memory queue 218 and the second stage memory queue 220 can be provided by memory resources of the wireless AP 204. In some examples, the first stage memory queue 218 and the second stage memory queue 220 can be physically separate from each other (e.g., different non-volatile memory chips). In some examples, the first stage memory queue 218 and the second stage memory queue 220 can be logically separate (e.g., via addressing) but contained within a unitary physical memory structure (e.g., one memory chip). Forcing the querying station 202 to obey a comeback delay 212-1 (e.g., a randomized comeback delay) before accessing the second stage memory queue 220 (e.g., access to larger portions of memory of the wireless AP 204) can help prevent attacking stations from using up large portions of the wireless AP's memory resources.

The wireless AP 204 can send a first GAS comeback response 216-1 to the querying station 202. The first GAS comeback response 216-1, according to some previous approaches, would include the information from the advertisement server 210 that was requested by the querying station 202. However, as discussed herein, the wireless AP 204, at this point, has not queried or received a response from the advertisement server 210. Therefore, the first GAS comeback response 216-1 can include a second comeback delay 212-2 to instruct the querying station 202 to wait for a period of time and then send a second GAS comeback request 214-2 to fetch the information from the advertisement server 210 from the wireless AP 204. A duration of the second comeback delay 212-2 can be set by the wireless AP 204 based on an expected length of time that will be used to query and receive a response from the advertisement server 210. In some instances, the first comeback delay 212-1 and the second comeback delay 212-2 can be different lengths of time, however examples are not so limited. Accordingly, the wireless AP 204 can query 222 the advertisement server 210 based on the GAS initial request 206 in response to receiving a comeback request 214-1 (e.g., in response to receiving a comeback request that complies with the first comeback delay 212-1) from the querying station 202. The response 224 from the advertisement server 210, which is based on the query 222 from the wireless AP, can be received by the wireless AP 204 and stored in the larger control block 226-2 in the second stage memory queue 220. The information received from the advertisement server 210 (e.g., IEs indicated by the shaded boxes in FIG. 2) can be sent by the wireless AP 204 to the querying station in a second GAS comeback response 216-2 in response to receiving the second GAS comeback request 214-2 from the querying station (e.g., and in response to the second GAS comeback request 214-2 complying with the second comeback delay 212-2).

Figure 3:
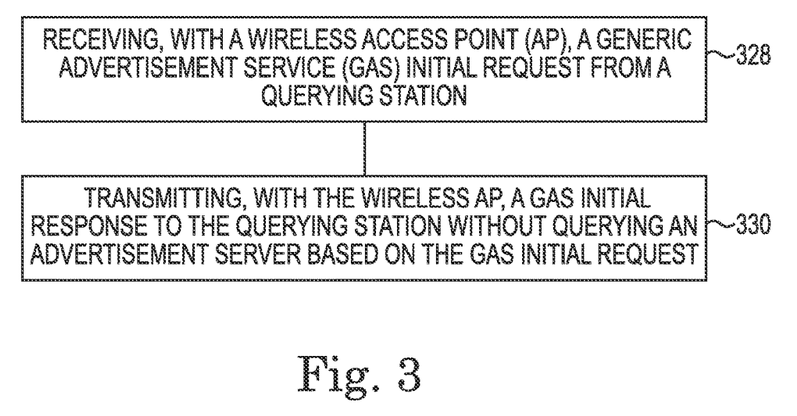
FIG. 3 is a flow chart illustrating an example of a method for preventing a memory attack to a wireless access point according to the present disclosure.

FIG. 3 is a flow chart illustrating an example of a method for preventing a memory attack to a wireless access point according to the present disclosure. At block 328, a generic advertisement service (GAS) initial request can be received from a querying station with a wireless access point (AP). At block 330, a GAS initial response can be transmitted, with the wireless AP, to the querying station without querying an advertisement server based on the GAS initial request.

As described herein, transmitting the GAS initial response without querying the advertisement server to get the information requested by the querying station can allow the wireless AP to gather information from the querying station to increase a likelihood that the querying station is not attempting to attack the wireless AP (e.g., that the GAS initial request is legitimate). For example, the wireless AP can include an indication of a comeback delay in the GAS initial response so that when and/or if the querying station replies to the GAS initial response with a GAS comeback request, the wireless AP can determine whether the querying station complied with the comeback delay. If the querying station complies with the comeback delay, it is less likely that the querying station is attempting to attack the wireless AP. After such a determination has been made, the wireless AP can later query the advertisement server on behalf of the querying station. As described herein, such examples can help prevent a memory attack on the wireless AP that would otherwise query the advertisement server before having more certainty whether the GAS initial request was not part of an attack (e.g., whether the GAS initial request was legitimate).

Figure 4A:
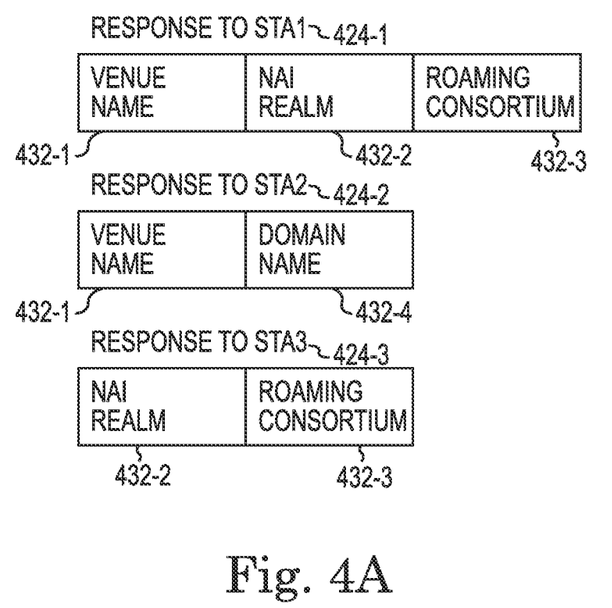
FIG. 4A is a diagram illustrating examples of responses from an advertisement server including information elements according to the present disclosure.

FIG. 4A is a diagram illustrating examples of responses 424-1, 424-2, 424-3 from an advertisement server (e.g., advertisement server 210 in FIG. 2) including information elements 432-1, 432-2, 432-3, 432-4 according to the present disclosure. Different mobile querying stations may query different numbers and/or types of IEs from an advertisement server. However, some of the IEs for different mobile querying stations may overlap. In the example illustrated in FIG. 4A, the response 424-1 to a first station includes an IE 432-1 for "Venue Name", and IE 432-2 for "NAI Realm", and an IE 432-3 for "Roaming Consortium". The response 424-2 to a second station includes the same IE 432-1 "Venue Name" as was returned for the first station. The response 424-2 to the second station also includes an IE 432-4 that was not included in the response to the first station, namely "Domain Name." The response 424-3 to a third station includes two IEs 432-2, 432-3 "NAI Realm" and "Roaming Consortium" respectively, that were both included in the response to the first station, but not to the second station.

The IEs 432-1, 432-2, 432-3, 432-4 can be ANQP IEs according to the IEEE 802.11u standard, for example. In general, the IEs can be fairly common (e.g., there are only so many different IEs that a querying station would request). Accordingly, a wireless AP often winds up buffering the same IEs in different control blocks for different stations. A mobile station that is performing a memory attack on a wireless AP will generally want to use up as much memory as possible in the wireless AP, and so it will send multiple queries (e.g., with spoofing MAC addresses as described herein) for IEs. However, according to a number of examples of the present disclosure, the wireless AP can employ a shared buffer for common IEs.

Figure 4B:
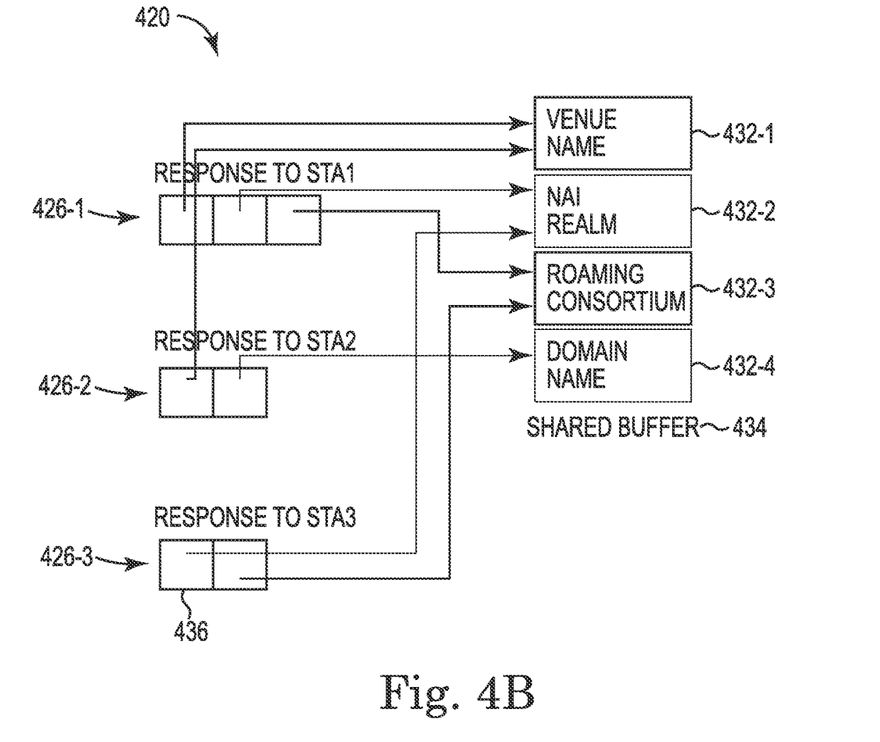
FIG. 4B is a diagram illustrating pointers from a memory queue to information elements in a shared memory buffer according to the present disclosure.

FIG. 4B is a diagram illustrating pointers (e.g., pointer 436) from a memory queue 420 to information elements 432-1, 432-2, 432-3, 432-4 in a shared memory buffer 434 according to the present disclosure. The IEs 432-1, 432-2, 432-3, 432-4 can be analogous to the IEs 432-1, 432-2, 432-3, 432-4 illustrated in FIG. 4A. The control blocks 426-1, 426-2, 426-3 can be analogous to the larger control block 226-2 illustrated in FIG. 2. The memory queue 420 can be analogous to the second stage memory queue 220 illustrated in FIG. 2. A wireless AP (e.g., wireless AP 204 in FIG. 2) can (e.g., via a non-transitory machine readable medium storing instructions executable by a processing resource of the wireless AP) store, in the shared memory queue 434, a first number of IEs 432-1, 432-2, 432-3 received from an advertisement server (e.g., advertisement server 210 in FIG. 2) in a response to a query on behalf of a first querying station. The wireless AP can store in the shared memory queue 434, a second number of IEs 432-4 received from the advertisement server in response to a second query on behalf of a second querying station that is different from the first number of IEs. For example, the wireless AP does not store an extra copy of IE 432-1, which was also received from the advertisement server in response to the second query on behalf of the second querying station because IE 432-1 is already stored in the shared memory queue 434 from the response to the first query.

The wireless AP can store a respective pointer to each of the first number of IEs 432-1, 432-2, 432-3 in a first control block 426-1 allocated to the first querying station. That is, the wireless AP can store a pointer in the allocated memory queue rather than the IE itself. The pointer uses less memory than the IE because the pointer can be a location (e.g., address) in the shared memory queue where the respective IE resides. The wireless AP can store a respective pointer to each of the second number of IEs 432-1, 432-4 in a second control block 426-2 allocated to the second querying station.

Such examples can help reduce the amount of memory used to store IEs for the wireless AP and can help mitigate the effects of a memory attack that could otherwise force copies of IEs to be stored in a queue associated with each query. Thus, duplicated storage of IEs can be eliminated. The shared memory queue 434 can be organized as a doubly linked list. For example, each IE can be a node in the doubly linked list including a type field, a content field, and a length field. The wireless AP can update the content field of a particular node according to a later received IE. For example, if the content of the IE 432-1 "Venue Name" changes according to a later received IE 432-1, the content field for that node can be updated. The length field can be used to help the wireless AP build comeback response fragments.

Figure 5:
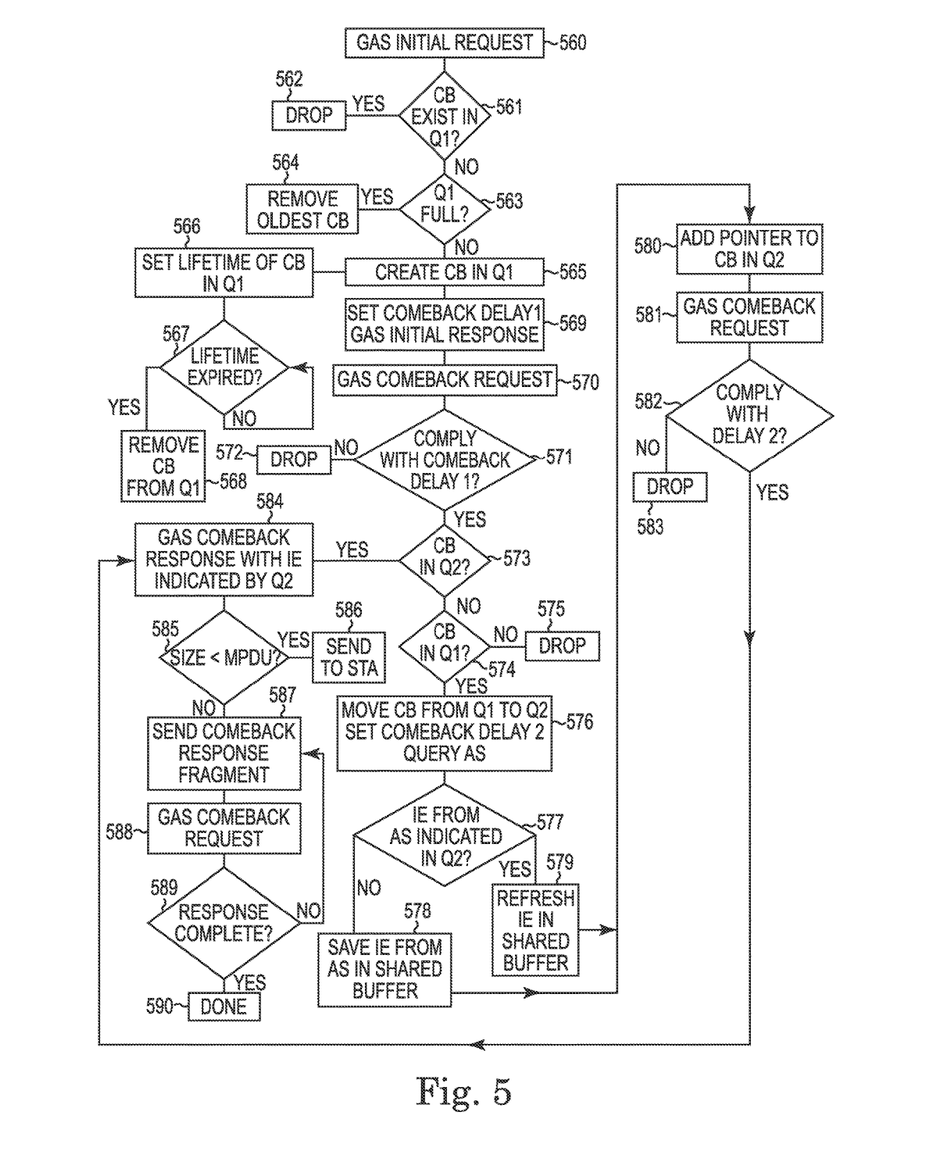
FIG. 5 is a flow chart illustrating an example of a method for preventing a memory attack to a wireless access point according to the present disclosure.

FIG. 5 is a flow chart illustrating an example of a method for preventing a memory attack to a wireless access point according to the present disclosure. At block 560 the wireless AP (e.g., analogous to the wireless AP 204 in FIG. 2) can receive a GAS initial request from a querying station (e.g., station 202 in FIG. 2). At block 561, the wireless AP can determine whether a control block ("CB") associated with the querying station exists in a first stage memory queue ("Q1"). If a control block already exists, the wireless AP can drop the GAS initial request at block 562. For example, a control block would already exist if the querying station had previously sent a GAS initial request without spoofing a MAC address. This could indicate a less advanced memory attack without spoofing, an error with the querying station causing it to send additional GAS initial requests, or some other cause for an additional GAS initial request that is not needed. The wireless AP can drop such a request to prevent a redundant operation.

At block 563 if a control block does not already exist in the first stage memory queue, a determination can be made as to whether the first stage memory queue is full. If the first stage memory queue is full, the wireless AP can remove an older (e.g., oldest) control block from the first stage memory queue to make room for a new one at block 564. If the first stage memory queue is not full, the wireless AP can create a new control block in the first stage memory queue at block 565. A lifetime for the control block can be set at block 566. The wireless AP can periodically (or continually) determine whether the lifetime of the control block has expired as indicated at block 567. If the lifetime of the control block has expired, the wireless AP can remove the control block from the first stage memory queue at block 568. Removing expired control blocks can free memory space for new control blocks from other mobile stations. However, if the lifetime of the control block has not expired, it can remain in the memory queue.

According to some examples of the present disclosure, the wireless AP can set the lifetime as the first comeback delay (e.g., described with respect to block 571) plus a relaxed estimation of total transmission time of the GAS initial response and the GAS comeback request (e.g., Δ). For example, assuming that the GAS messages are transmitted at 1 megabit per second (Mbps) and the size of the initial response and comeback request is 1000 bits, Δ can be set $$7 \times \left( \frac{1000}{1 \text{ M}} + \frac{1000}{1 \text{ M}} \right) = .014 \text{ seconds (14 ms)},$$

as assuming that the retry limit is 7.

After block 565, where the wireless AP created a control block in the first stage memory queue, the wireless AP can set a comeback delay and send an indication of the comeback delay with a GAS initial response at block 569. At block 570, the wireless AP can receive a GAS comeback request from the querying station and make a determination as to whether the GAS comeback request complies with the comeback delay at block 571. If the GAS comeback request does not comply with the comeback delay, the wireless AP can drop the GAS comeback request at block 572. If the GAS comeback request complies with the comeback delay, the wireless AP can make a determination as to whether there is a control block for the querying station in a second stage memory queue ("Q2") at block 573. After block 573, the method flow diverges into two different paths. Blocks 574 through 582 eventually meet with block 584, which also flows directly from block 573. Blocks 574 through block 583 will be described first.

If the wireless AP determines that a control block does not exist in the second stage memory queue for the querying station at block 573, then the wireless AP can determine whether a control bock for the querying station exists in the first stage memory queue at block 574. If a control block does not exist for the querying station in either the first or the second stage memory queues, then the wireless AP can drop the GAS comeback request as indicated at block 575. A received GAS comeback request that is not affiliated with a querying station having a control block in the first memory queue at this stage could be indicative of a memory attack from a station that is spoofing its MAC address. However, if the querying station does have a control block in the second stage memory queue, then the wireless AP can move the control block from the first stage memory queue to the second stage memory queue, set a second comeback delay, and query the advertisement server ("AS") on behalf of the querying station at block 576.

At block 577, the wireless AP can make a determination as to whether an IE (e.g., any of the IEs) received from the advertisement server is indicated (e.g., by a pointer as described in association with FIG. 4B) in the second stage memory queue. If the IE is not indicated in the second stage memory queue, then the wireless AP can save the IE from the advertisement server in the shared memory queue (e.g., shared buffer 434 illustrated in FIG. 4B) at block 578. However if the IE is indicated in the second stage memory queue, then the wireless AP can update (e.g., refresh) the IE in the shared buffer (e.g., if the IE received from the advertisement server includes any changes from the previously stored version of the IE) at block 579. That is, the wireless AP can update one of the first number of IEs stored in the shared memory queue according to a particular one of the second number of IEs that correspond thereto. From blocks 578 and 579, the method flow converges to block 580.

At block 580, the wireless AP can add a pointer to the control block in the second stage memory queue. At block 581, the wireless AP can receive a second GAS comeback request from the querying station. The wireless AP can make a determination as to whether the second comeback request complies with the second comeback delay at block 582. If the second comeback request does not comply with the second comeback delay, the wireless AP can drop the second comeback request at block 583 to help prevent a possible memory attack. However, if the second comeback request complies with the second comeback delay, the wireless AP can send a GAS comeback response with the IE(s) indicated by the pointer in the second stage memory queue at block 584. Returning to block 573, in that instance, if the wireless AP had determined that the first GAS comeback request was from a querying station with a control block in the second stage memory queue, it could send a GAS comeback response with the IE(s) indicated by the pointer in the second stage memory queue at block 584.

At block 585 the wireless AP can determine whether a size of the GAS comeback response (e.g., including the IEs) to be sent to the querying station is smaller than a maximal protocol data unit (MPDU) size for one message frame. If the size of the message is less than an MPDU, then the wireless AP can send the message to the querying station at block 586. However, if the size is greater than an MPDU, then the wireless AP can send a comeback response fragment at block 587. After sending the comeback response fragment, the wireless AP can receive an additional GAS comeback request from the querying station at block 588. At block 589, If the wireless AP determines that the response is not complete, the wireless AP can send an additional comeback response fragment at block 587. However, if the wireless AP determines that the response is complete, then the method flow can end at block 590.

Figure 6:
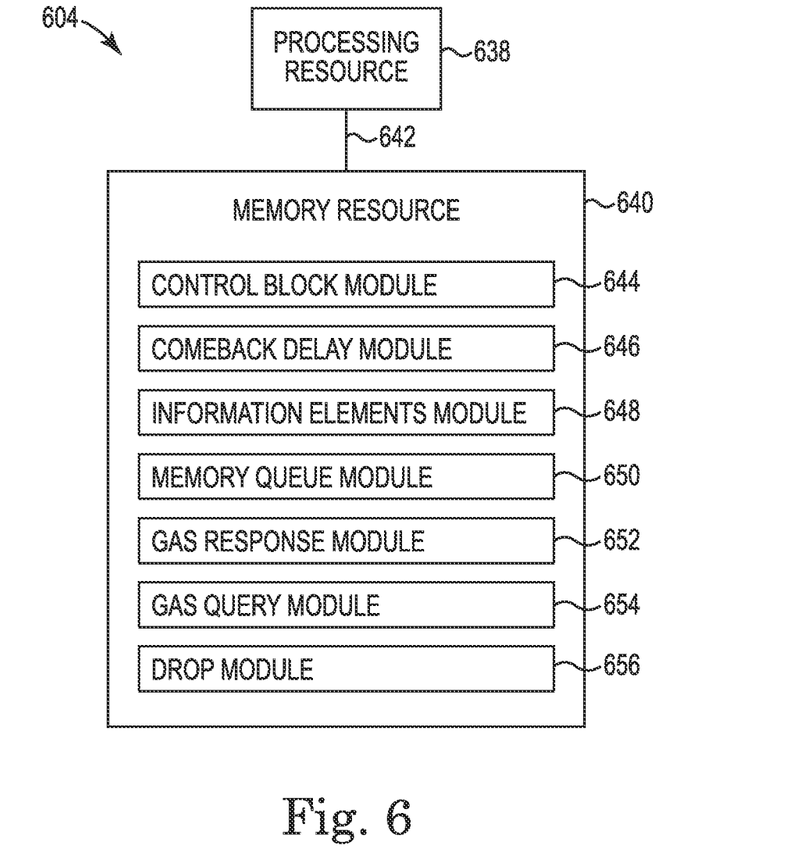
FIG. 6 is a diagram illustrating an example of a wireless access point according to the present disclosure.

FIG. 6 is a diagram illustrating an example of a wireless AP 604 according to the present disclosure. The wireless AP 604 can be analogous to the wireless AP 204 in FIG. 2. The wireless AP 604 can utilize software, hardware, firmware, and/or logic to perform a number of functions. The wireless AP 604 can be a combination of hardware and program instructions configured to perform a number of functions (e.g., actions). The hardware, for example, can include a number of processing resources 638 and a number of memory resources 640, such as a machine-readable medium (MRM) or other memory resources 640. The memory resources can be internal and/or external to the wireless AP 604 (e.g., the wireless AP 604 can include internal memory resources and have access to external memory resources). The program instructions (e.g., machine-readable instructions (MRI)) can include instructions stored on the MRM to implement a particular function (e.g., an action such as preventing a memory attack). The set of MRI can be executable by one or more of the processing resources 638. The memory resources 640 can be coupled to the wireless AP 604 in a wired and/or wireless manner. For example, the memory resources 640 can be an internal memory, a portable memory, a portable disk, and/or a memory associated with another resource, e.g., enabling MRI to be transferred and/or executed across a network such as the Internet.

Memory resources 640 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of machine-readable media.

The processing resources 638 can be coupled to the memory resources 640 via a communication path 642. The communication path 642 can be local or remote to the wireless AP 604. Examples of a local communication path 642 can include an electronic bus internal to a machine, where the memory resources 640 are in communication with the processing resources 638 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 642 can be such that the memory resources 640 are remote from the processing resources 638, such as in a network connection between the memory resources 640 and the processing resources 638. That is, the communication path 642 can be a network connection. Examples of such a network connection can include local area network (LAN), wide area network (WAN), personal area network (PAN), and the Internet, among others.

As shown in FIG. 6, the MRI stored in the memory resources 640 can be segmented into a number of modules 644, 646, 648, 650, 652, 654, 656 that when executed by the processing resources 638 can perform a number of functions. As used herein a module includes a set of instructions included to perform a particular task or action. The number of modules 644, 646, 648, 650, 652, 654, 656 can be sub-modules of other modules. For example, the comeback delay module 646 can be a sub-module of the GAS response module 652 and/or the comeback delay module 646 and the GAS response module 652 can be contained within a single module. Furthermore, the number of modules 644, 646, 648, 650, 652, 654, 656 can comprise individual modules separate and distinct from one another. Examples are not limited to the specific modules 644, 646, 648, 650, 652, 654, 656 illustrated in FIG. 6.

The wireless AP 604 can create a control block (e.g., using control block module 644) in a first memory queue (e.g., using memory queue module 650) in response to receiving a GAS initial request from a querying station. The wireless AP 604 can return a GAS initial response (e.g., using GAS response module 652) to the querying station with an indication of a first comeback delay (e.g., using comeback delay module 646). The wireless AP 604 can store previously received IEs (e.g., using information elements module 648) from an advertisement server in a second memory queue (e.g., using memory queue module 650). The wireless AP 604 can drop (e.g., using drop module 656) a first GAS comeback request in response to a querying station corresponding to the first GAS comeback request not having a control block in the first or the second memory queues (e.g., using memory queue module 650). The wireless AP 604 can drop (e.g., using drop module 656) a second GAS comeback request in response to a querying station corresponding to the second GAS comeback request having a control block in the first memory queue (e.g., using memory queue module 650) and in response to the second GAS comeback request not complying with the first comeback delay (e.g., using comeback delay module 646).

The wireless AP 604 can return a GAS comeback response (e.g., using GAS response module 652) including an IE from the second memory queue (e.g., using memory queue module 650) in response to a third comeback request from a querying station having a control block (e.g., using control block module 644) in the second memory queue (e.g., using memory queue module 650) and in response to the third comeback request complying with the first comeback delay (e.g., using comeback delay module 646). The wireless AP 604 can move a control block (e.g., using control block module 644) for a querying station from the first memory queue to the second memory queue (e.g., using memory queue module 650), query the advertisement server (e.g., using GAS query module 654), and return a GAS comeback response (e.g., using GAS response module 652) with an indication of a second comeback delay (e.g., using comeback delay module 646) in response to a fourth comeback request from a querying station having a control block (e.g., using control block module 644) in the first memory queue (e.g., using memory queue module 650) and in response to the fourth comeback request complying with the first comeback delay (e.g., using comeback delay module 646).

The wireless AP 604 can randomly generate the comeback delay within a range of comeback delays (e.g., using comeback delay module 646). The wireless AP 604 can set a lifetime of the control block (e.g., using control block module 644) in the first memory queue (e.g., using memory queue module 650). The wireless AP 604 can periodically check for expired control blocks (e.g., using control block module 644).

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method of preventing a memory attack to a wireless access point (AP) comprising:
   receiving, by the wireless AP, a generic advertisement service (GAS) initial request from a querying station;
   allocating, by the wireless AP, an initial control block in a first stage memory queue for the GAS initial request;
   transmitting, by the wireless AP, a GAS initial response including an indication of a comeback delay to the querying station without querying an advertisement server based on the GAS initial request;

receiving, by the wireless AP, a GAS comeback request from the querying station following the comeback delay;

moving, by the wireless AP, the initial control block from the first stage memory queue to a larger control block in a second stage memory queue in response to receiving the GAS comeback request from the querying station;

querying, by the wireless AP, the advertisement server based on receipt of the GAS comeback request from the querying station; and transmitting, by the wireless AP, a GAS comeback response to the querying station.

2. The method of claim 1, wherein the comeback delay is randomly generated within a range of comeback delays.

3. The method of claim 1, wherein the method includes:
setting, by the wireless AP, the comeback delay associated with the GAS initial response; and
storing, by the wireless AP, the comeback delay and parameters of the GAS initial request including a media access control (MAC) address of the querying station, a dialog identifier, and a query type in the initial control block.

4. The method of claim 1, wherein the method includes:
storing, by the wireless AP, a response from the advertisement server in the larger control block in the second stage memory, wherein the response from the advertisement server is based on the query from the wireless AP.

5. The method of claim 1, wherein the method includes:
querying, by the wireless AP, the advertisement server based on query types stored in the first stage memory queue in response to the GAS comeback request received from the querying station complying with the comeback delay; and
dropping, by the wireless AP, the GAS comeback request from the querying station in response to the GAS comeback request not complying with the GAS comeback delay.

6. The method of claim 1, wherein the method includes:
querying, by the wireless AP, the advertisement server based on the GAS initial request in response to the GAS comeback request received from the querying station complying with the comeback delay; and
dropping, by the wireless AP, the GAS comeback request from the querying station in response to the GAS comeback request not complying with the comeback delay.

7. The method of claim 6, wherein dropping the GAS comeback request in response to the GAS comeback request not complying with the comeback delay includes dropping the GAS comeback request in response to the GAS comeback request being sent before expiration of the comeback delay.

8. The method of claim 1, wherein the method includes:
setting, by the wireless AP, a first comeback delay for a first GAS comeback request associated with the querying station; and
setting, by the wireless AP, a second comeback delay for a second GAS comeback request associated with the querying station, wherein the first and the second comeback delays are different.

9. A non-transitory machine-readable medium storing instructions for preventing a memory attack to a wireless access point executable by a machine to cause the machine to:

store, in a shared memory queue, a first number of information elements received from an advertisement server in a response to a query on behalf of a first querying station;

store in the shared memory queue, a second number of information elements received from the advertisement server in response to a query on behalf of a second querying station that is different from the first number of information elements;

store a respective pointer to each of the first number of information elements in a first control block allocated to the first querying station; and store a respective pointer to each of the second number of information elements in a second control block allocated to the second querying station, wherein the storage of the respective pointer to each of the first number of information elements in the first control block and the storage of the respective pointer to each of the second number of information elements in the second control block reduces an amount of memory used to store the first number of information elements and the second number of information elements for the wireless access point.

10. The medium of claim 9, wherein the instructions are executable to update one of the first number of information elements stored in the shared memory queue according to a particular one of the second number of information elements that corresponds thereto.

11. The medium of claim 9, wherein the instructions are executable to:
organize the shared memory queue as a doubly linked list, wherein each information element comprises a node in the doubly linked list including a type field, a content field, and a length field; and
update the content field of a particular node according to a later received information element.

12. The medium of claim 9, wherein the first and the second numbers of information elements comprise access network query protocol (ANQP) information elements according to an IEEE 802.11u standard.

13. A wireless access point (AP), comprising:
a processing resource in communication with a memory resource, wherein the memory resource includes a set of instructions to prevent an attack to the wireless AP, executable by the processing resource to:
create a control block in a first memory queue in response to receiving a generic advertisement service (GAS) initial request from a querying station;
return a GAS initial response to the querying station with an indication of a first comeback delay;
store previously received information elements from an advertisement server in a second memory queue;
drop a first GAS comeback request in response to the querying station corresponding to the first GAS comeback request not having a control block in the first or the second memory queues;
drop a second GAS comeback request in response to the querying station corresponding to the second GAS comeback request having a control block in the first memory queue and in response to the second GAS comeback request not complying with the first comeback delay;
return a GAS comeback response including an information element from the second memory queue in response to a third comeback request from the querying station having a control block in the second memory queue and in response to the third comeback request complying with the first comeback delay; and move a control block for the querying station from the first memory queue to the second memory queue, query the advertisement server, and return a GAS comeback response with an indication of a second comeback delay in response to a fourth comeback request from the querying station having a control block in the first memory queue and in response to the fourth comeback request complying with the first comeback delay.

14. The wireless AP of claim 13, wherein the instructions are executable to:
randomly generate the first comeback delay within a range of comeback delays;
set a lifetime of the control block in the first memory queue; and
periodically check for expired control blocks.

15. A method of preventing a memory attack to a wireless access point (AP) comprising:
receiving, by the wireless AP, a generic advertisement service (GAS) initial request from a querying station;
transmitting, by the wireless AP, a GAS initial response including an indication of a comeback delay to the querying station without querying an advertisement server based on the GAS initial request;
allocating, by the wireless AP, an initial control block in a first stage memory queue for the GAS initial request; and
moving, by the wireless AP, the initial control block from the first stage memory queue to a larger control block in a second stage memory queue in response to receiving a comeback request from the querying station.

16. The method of claim 15, wherein the method includes:
setting, by the wireless AP, a comeback delay associated with the GAS initial response; and
storing, by the wireless AP, the comeback delay and parameters of the GAS initial request including a media access control (MAC) address of the querying station, a dialog identifier, and a query type in the initial control block.

17. The method of claim 15, wherein the method includes:
querying, by the wireless AP, the advertisement server based on the GAS initial request in response to receiving a comeback request from the querying station; and
storing, by the wireless AP, a response from the advertisement server in the larger control block in the second stage memory, wherein the response from the advertisement server is based on the query from the wireless AP.

18. The method of claim 15, wherein transmitting the GAS initial response includes transmitting the GAS initial response including an indication of a comeback delay, and wherein the method includes:
querying, by the wireless AP, the advertisement server based on query types stored in the first stage memory queue in response to receiving a comeback request from the querying station that complies with the comeback delay; and
dropping, by the wireless AP, the comeback request from the querying station in response to the comeback request not complying with the comeback delay.

* * * * *